Oct. 29, 1963 H. KERNS 3,108,750
LAMINATED PANEL MEANS AND ELECTRICAL CONDUIT SYSTEMS THEREFOR
Filed Nov. 30, 1959 3 Sheets-Sheet 3
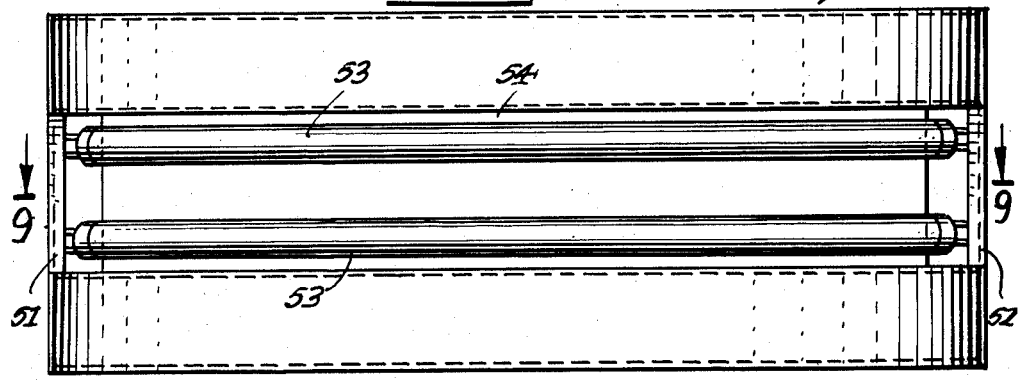
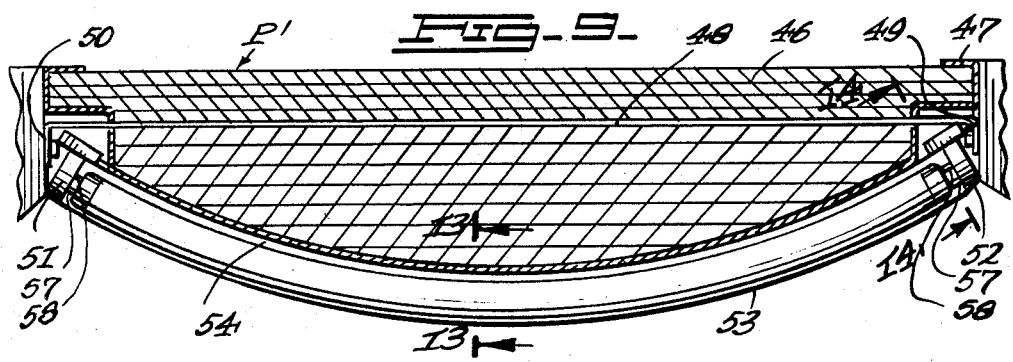
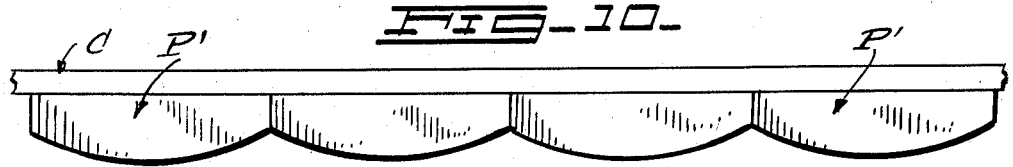
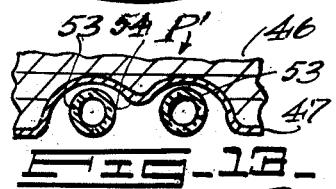
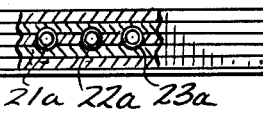
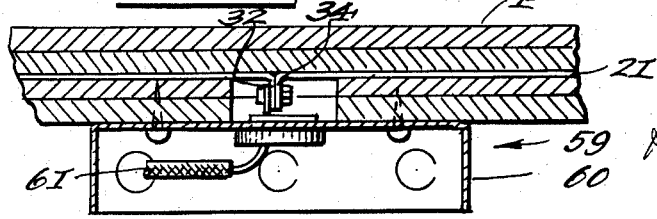
INVENTOR.
Homer Kerns.

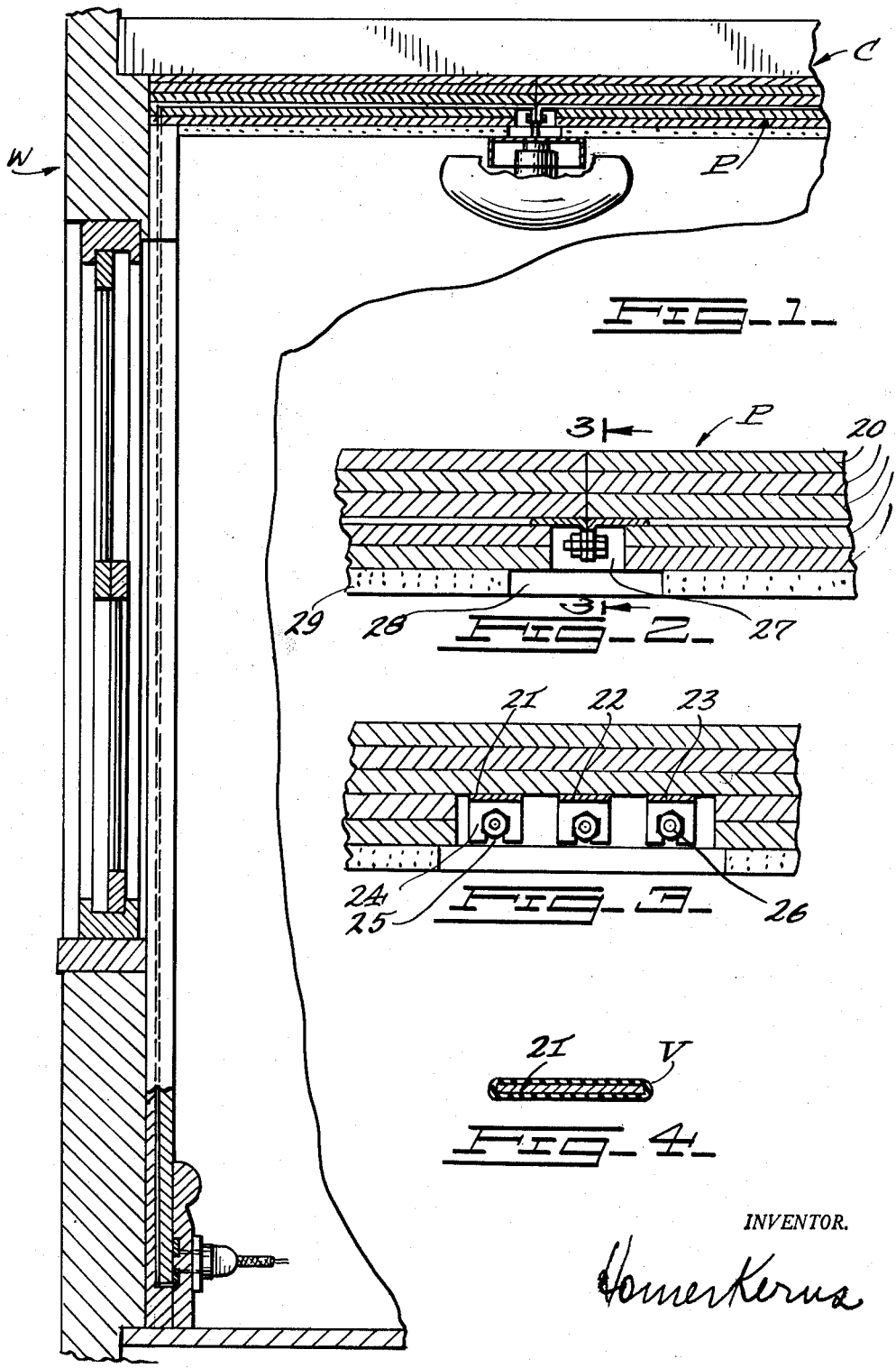

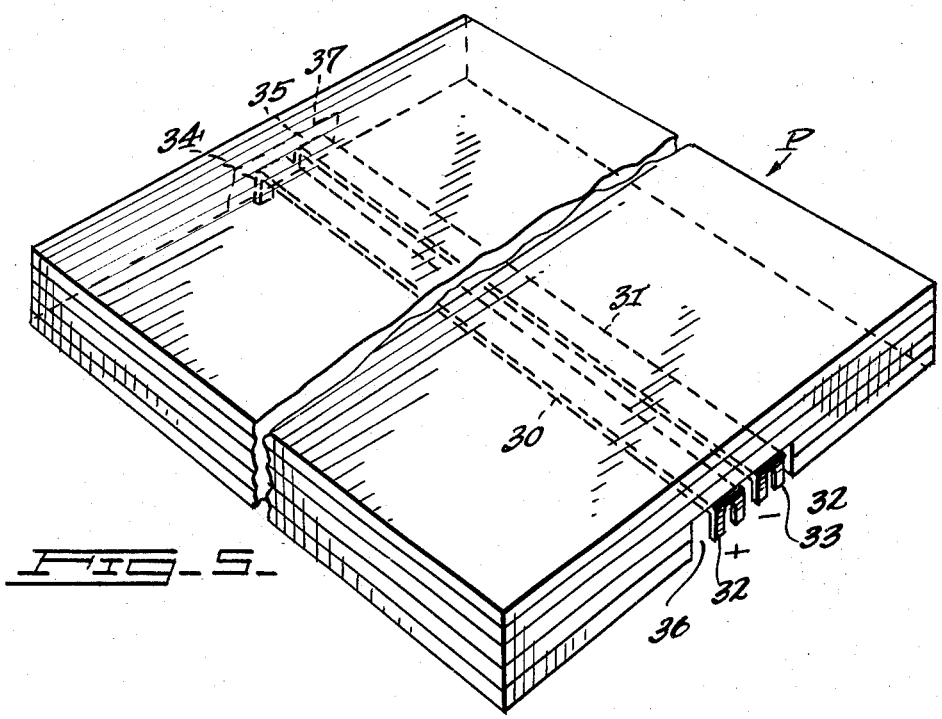
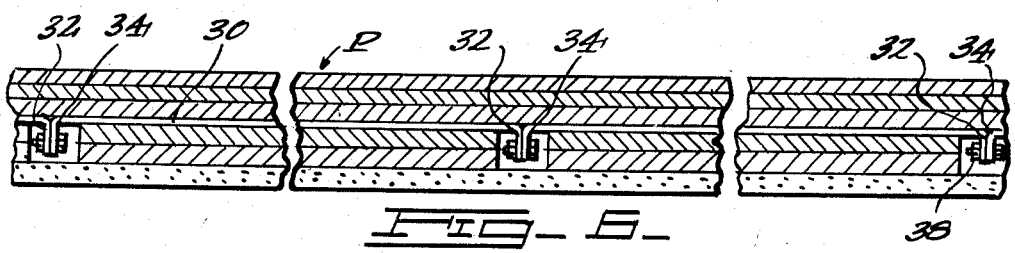
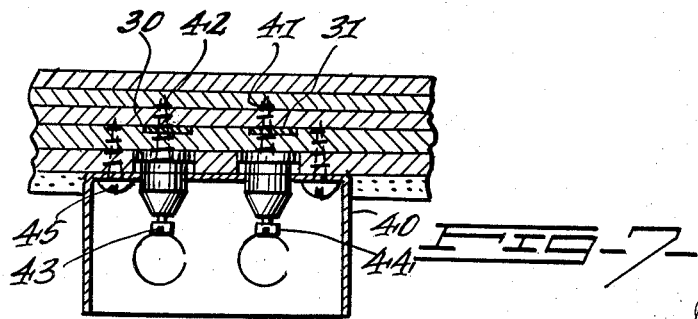

United States Patent Office 3,108,750
Patented Oct. 29, 1963

3,108,750
LAMINATED PANEL MEANS AND ELECTRICAL CONDUIT SYSTEMS THEREFOR
Homer Kerns, New York, N.Y.
Filed Nov. 30, 1959, Ser. No. 856,175
1 Claim. (Cl. 240—51.11)

This invention relates to laminated panels and more particularly to structural panels which may be provided with electrical conduit means formed within the laminations of the panel during the process of manufacture.

Referring to the embodiment of the present invention, conventional available wall panels in general use are formed of several separate layers of laminated board glued and pressed together into a compact laminated panel. Such laminated panel may be mounted to ceilings and walls and may support electrical wiring exterior thereto. The present invention provides for electrical conduit means mounted interior to the layers and laminations in said panel, so that they are concealed from view.

One object of this invention is to provide a laminated panel which may be inexpensive to manufacture and easy to erect to form ceilings, walls and partitions.

Another object of this invention is to provide a laminated panel formed of separate layers or laminations and containing a system of electrical conduits molded within the panel during the process of manufacture.

A further object of this invention is to provide a laminated panel which may be fitted with a system of conduit wires which may be formed into the fabric of the laminated panel, and means provided to permit the mounting of such a panel to each other and in such a manner as to allow the free passage of electric current from the first to the last panel.

An additional object of this invention is to provide electrical connector means to permit the mounting of fluorescent light fixtures.

A further object of this invention is to provide a light fixture of such a form and shape as to be readily adaptable to a curved laminated panel.

Other features and advantages of the invention will be understood from the more detailed description to follow in connection with the drawings in which:

Referring to the figures in the accompanying drawings:

FIG. 1 is an embodiment of the present invention showing a number of laminated panels mounted to walls and the ceiling of a dwelling.

FIG. 2 is a section through a laminated panel embodying the present invention showing the manner in which the system of electrical conduits is mounted in the body of the panel and the manner in which the electrical conduits in one panel are electrically connected to the conduits in the next panel.

FIG. 3 is a section on the line 3—3 of FIG. 2 showing the manner in which a three phase electrical conduit system, formed of three flat-shaped wires is molded within the body of the laminated panel.

FIG. 4 shows an enlarged section through one of the flat-shaped electrical conduits with its insulator covering.

FIG. 5 is a perspective view showing an embodiment of the present invention consisting of a laminated panel mounting a conduit system of only two flat-shaped wires.

FIG. 6 is a longitudinal section through a row of laminated panel sections showing the manner in which the electrical conduit system in one panel section connects with the electrical conduit system in another panel section to form a closed electrical circuit.

FIG. 7 shows the manner in which a connector or a light fixture box may be mounted to a laminated panel.

FIG. 8 shows the manner of mounting a light fluorescent lamp to a curved laminated panel.

FIG. 9 is a section on the line 9—9 of FIG. 8.

FIG. 10 shows the manner in which a laminated panel of the kind and shape illustrated in FIGS. 8 and 9 may be mounted side by side in rows.

FIG. 11 shows two distinct types of electrical conduit system which may be provided within the laminations of a panel. At (A) is shown a laminated panel provided with a three phase wiring system while at (B) the laminated panel is provided with a conventional three phase system which may include three conventional electric wires or three pipes to receive the wires.

FIG. 12 shows the manner in which a light fixture may be mounted to the system of conduit wires in a panel shown in FIG. 11 (A).

FIG. 13 is a section on the line 13—13 through the fluorescent lamp and the light reflector in the curved laminated panel shown in FIG. 9.

FIG. 14 is a partial section on the line 14—14 showing the electrical connectors or contacts in the light fixture in FIG. 9.

Referring more particularly to FIG. 1 the latter illustrates an embodiment of the present invention wherein (C) designates the ceiling of a dwelling, (W) the walls and (P) a plurality of laminated panels held to the ceiling and walls. Referring in particular to the panels (P) the latter may be produced from a plurality of separate laminations 20 which are glued and pressed into one single panel during the process of manufacture. It may be seen that an electrical conduit system formed of three separate flat-shaped conduit wires is fitted within the laminations of the panel. Such a conduit system may represent a three phase alternating current wiring system consisting of the flat-shaped wires 21, 22 and 23 inclusive, with a direct current system having only two such conduit wires. The flat-shaped wires in question may be covered with a mantel of insulation (V) and may run the entire length of the panel. At either extreme ends the wires 21, 22 and 23 may be shaped into a bend portion 24 having an elongated groove 25 to receive a fastening bolt and nut 26. To permit easy access for mounting light fixtures to the wires 21, 22 and 23, at either extreme end of the laminated panel, where the flat-shaped wires end into the bend 24, the panel sections are somewhat shorter to form a clearance 27 which may be in alignment with a similar clearance (or an opening) 28 in the plaster covering of the ceiling. FIG. 4 shows an enlarged section through one of the flat-shaped wires with its insulator covering (V).

FIG. 5 is a perspective view showing a laminated panel section which is provided with a duel electrical conduit system formed of two flat-shaped wires 30 and 31. The latter being formed with a bracketed section or projection 32 and 33. A similar projection is provided at the other end indicated as 34 and 35 for each of the flat-shaped wires. The projections 32, 33, 34 and 35 extend beyond the grooved portions 36 and 37 on either side of the panel to permit for an easy access to the conduit wires when mounting an electric fixture. FIG. 6 shows the laminated panels mounted side by side forming a ceiling with their respective projections 32 and 34 contacting so as to provide a closed electrical connection. The panels are shown being securely held to each other by means of the bolt and nut 38.

FIGS. 8, 9 and 10 inclusive illustrate a modification of the laminated panel shown in FIGS. 1 to 7 inclusive. In the latter case the panel P' is formed into a curved body from a porous material 41 held within a metallic casing 47. Similar arrangement of electrical conduit system as already described is here also possible. Such a system of conduit wires is indicated by the numeral 48. On either side thereof, the curved panel may be provided with electrical connectors of lampholders 49 and 50. The latter may be provided with a pair of electrical fixtures 51 and 52 supporting a fluorescent lamp within the circular light reflector 54 in the panel. To facilitate electrical connection, the electrical fixtures or brackets 51 and 52 may be provided with contacting springs 55 and 56 to hold and to support the fluorescent lamp's pins (contacts) 58 and 59. FIG. 10 illustrates the manner in which a row of curved panels similar in design to the one shown in FIGS. 8 and 9, may be mounted side by side to form a ceiling. Similar wall mounting is also possible.

FIG. 12 shows the manner in which a fixture box 59 with a frame 60 may be secured to the light terminal of a panel. The connector wire leading from the conduit system 61 in the panel may connect the system to an electrical piece of equipment (not shown).

It is to be seen from the above description of the panel embodying the present invention that it constitutes only a preferred form, it is understood that other forms might be adopted, as may come within the scope of the claims which follow.

What I claim is:

A laminated panel including several sections of insulated material laminated together to form a flat laminated body, flat thin metallic strips constituting electrical conduits mounted within and running the length of said body, said strips mounted parallel to each other and insulated one from the other, light source supporting means mounted to said body at each end of said body, said means comprising a pair of supporting brackets with lamp sockets therein, screw means mounting said supporting brackets to said panel and in electrical contact with said sockets, said screws passing through said thin metallic strip in said panel to establish electric contact also with said strips, an elongated fluorescent lamp mounted in said sockets of said bracket means, the screw means in one bracket passing through one strip, and the screw means in the other bracket passing through another strip to allow passage of electric current from said strips to said sockets to light the fluorescent lamp.

References Cited in the file of this patent

UNITED STATES PATENTS

| | | |
|---|---|---|
| 2,028,453 | Hoffman | Jan. 21, 1936 |
| 2,674,686 | Harrison | Apr. 6, 1954 |
| 2,818,497 | Alden | Dec. 31, 1957 |
| 2,821,800 | Hardesty | Feb. 4, 1958 |
| 2,824,954 | Roper | Feb. 25, 1958 |
| 2,957,157 | Carter | Oct. 18, 1960 |